July 19, 1966     D. C. ANTHONY     3,261,224
NUT FOR BALL SCREW AND NUT ASSEMBLY
Filed Jan. 27, 1964     2 Sheets-Sheet 1
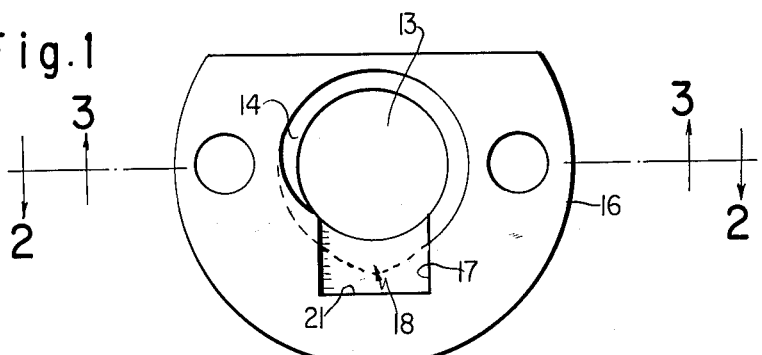
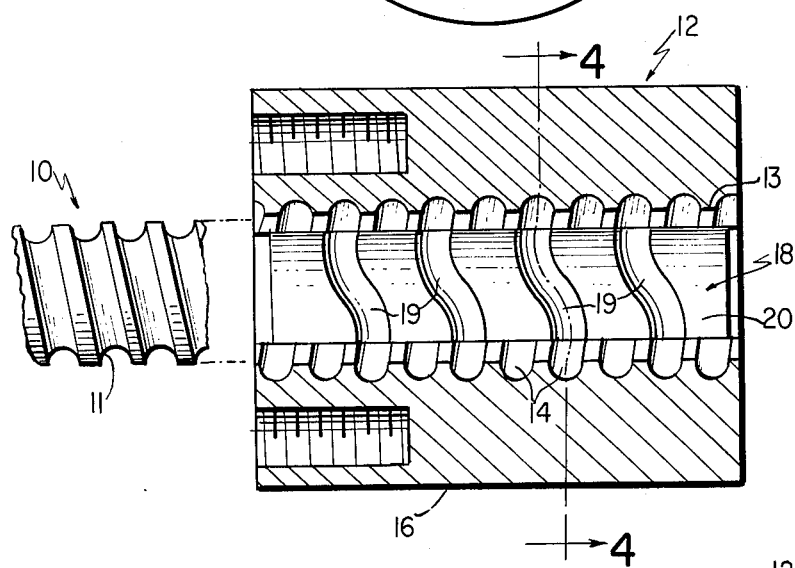
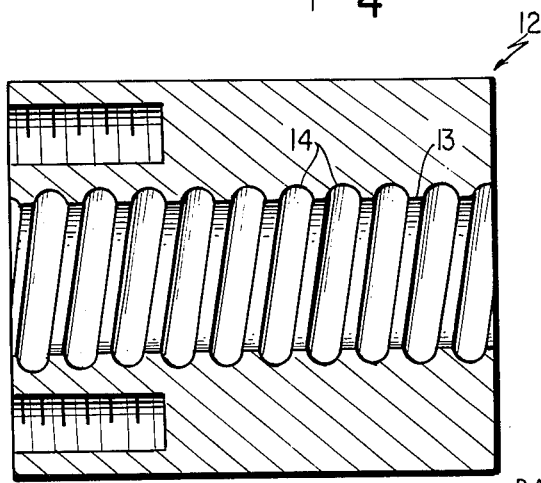
INVENTOR
DAVID C. ANTHONY
BY
Ernest A. Joenen
ATTORNEY July 19, 1966    D. C. ANTHONY    3,261,224
NUT FOR BALL SCREW AND NUT ASSEMBLY
Filed Jan. 27, 1964    2 Sheets-Sheet 2

INVENTOR
DAVID C. ANTHONY
BY
ATTORNEY

United States Patent Office 3,261,224
Patented July 19, 1966

3,261,224
NUT FOR BALL SCREW AND NUT ASSEMBLY
David C. Anthony, Paterson, N.J., assignor to Specialties Development Corporation, Belleville, N.J., a corporation of New Jersey
Filed Jan. 27, 1964, Ser. No. 340,472
10 Claims. (Cl. 74—459)

The present invention relates to ball screw and nut assemblies, and more particularly, to an improved nut assembly of the type provided with an internal ball cross-over for transferring and circulating balls within one complete screw and nut member ball groove convolution.

Heretofore, ball screw and nut assemblies of the foregoing described type have been utilized which were fabricated by accurately locating and machining an aperture or slot in the nut member, accurately machining an insert to provide ball cross-over grooves or channels accurately dimensioned for cooperation with the nut member and screw member ball groove convolutions, and positioning the insert in the slot or aperture in fixed securement with the nut. Such accurately close manufacturing tolerances are difficult and costly to obtain, particularly in miniature assemblies wherein the nut occupies a space of only about 0.150 cubic inch, wherefor the rejection rate of assemblies so produced is exceedingly high.

Accordingly, an object of the present invention is to provide a ball screw and nut assembly which is not subject to the foregoing difficulties and disadvantages and can be made by mass production methods without resorting to close tolerances.

Another object is to provide such an assembly including two or more ball cross-over grooves which are self adjusting with respect to the screw and nut ball groove convolutions.

Another object is to provide such an assembly wherein a cross-over insert is movable in three directions and is retained within the nut without securing means or springs.

Another object is to provide such an assembly wherein the insert can move axially and radially and can rotate about an axis parallel to the longitudinal axis of the assembly.

Another object is to provide such an assembly wherein the ball cross-overs are independently self adjusting.

Another object is to provide such an assembly wherein the screw is wiped and/or lubricated between cross-overs.

Another object is to provide such an assembly which can be produced in miniature sizes.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawings:

FIG. 1 is an enlarged end elevational view of a nut for a ball screw and nut assembly in accordance with the present invention.

FIG. 2 is a sectional view taken along the line 2—2 on FIG. 1.

FIG. 3 is a sectional view taken along the line 3—3 on FIG. 1.

Figure 4:
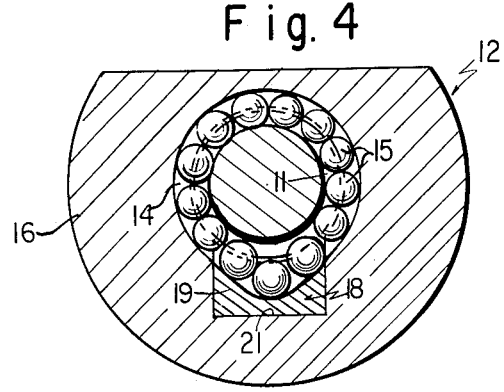
FIG. 4 is a sectional view taken along the line 4—4 on FIG. 2 illustrating the balls and screw in assembly with the nut.

Referring now to FIGS. 1 to 5 of the drawings in detail, there is shown an assembly which generally comprises a screw member 10 having external helical ball groove convolutions 11 thereon and a nut member assembly 12 having a bore 13 extending therethrough provided with internal helical ball groove convolutions 14 therein for cooperation with the groove convolutions 11 to confine ball bearings 15 as described hereinafter.

Figure 5:
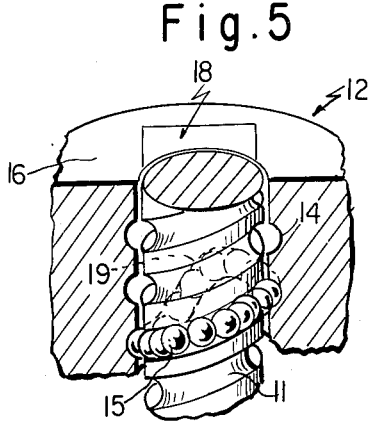
FIG. 5 is a fragmentary perspective in longitudinal of the assembly shown in FIG. 4.

The nut member assembly 12 comprises a nut member 16 which has the bore 13 provided with the groove convolutions 14, and a cross-over element 18. The nut member further has an axially extending radially facing slot 17 passing through the groove convolutions 14 for movably mounting the cross-over element 18. The cross-over element has two or more cross-over groove means or channels 19 (four being shown) formed in an arcuate concave upper face 20. Each channel is arranged for transferring and circulating balls 15 within one complete complementary screw and nut member groove convolution (FIGS. 2 and 5).

As shown in FIG. 1, the slot 17 is generally rectangular in cross-section and the element 18 has a rectangular base 21 movably positioned in the slot and dimensioned to provide clearance at the sides and bottom of the slot so that the element can move freely in axial and radial directions and a slight distance in a lateral direction. This enables the channels 19 to adjust themselves with respect to the ball groove convolutions 11 and 14, whereby the channels need not be accurately machined and located within close tolerances to avert jamming of the balls at the cross-over channel entrances and exits.

As best shown in FIG. 2, the element 18 is shorter in length than the slot 17 to enable the element to be placed in a position to adjust axially without protruding from the ends of the bore 13. Also, it will be noted that the slot has no stops at the ends thereof for confining the element within the nut member 16 because the balls circulating within complete complementary groove convolutions lock the element within the nut member against axially displacement except to allow the element to adjust axially. Furthermore, no springs are required to urge the element 18 towards the screw member 10 in a radial direction.

The nut member assembly shown in FIGS. 1 to 5 has been successfully produced in minature sizes with the nut member having an outer diameter of 0.5 inch and a length of 0.6 inch whereby the nut member occupies a rectangular space of about 0.15 cubic inch. The bore 13 of such a nut member has a diameter of 0.195; and the convolutions 11 and 14, and the channels 19 are dimensioned to accommodate balls 15 having a diameter of 0.039 inch with the convolutions having a lead of 0.0625 inch. The slot 17 has a width of 0.143 inch and a depth at its sides of about 0.095 inch. The cross-over element 18 has a length of 0.565 inch. The arcuate face 20 has a radius about equal to that of the bore 13; and the base 21 has a width of 0.140 inch and a depth at its sides of about 0.10 inch.

By so dimensioning and movably arranging the parts of the assembly, the balls strike the cross-over at or below the center line and sharp corners between the side edges of the grooves 11 and 14, and adjacent cylindrical surfaces of the screw, nut and cross-over element are permissible without jamming of the balls or excessive wear on the ball transferring surfaces.

Figure 6:
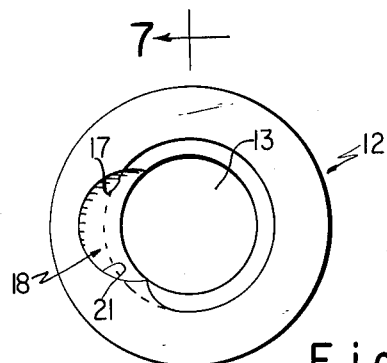
FIG. 6 is an enlarged end elevational view with a nut provided with a modified ball cross-over insert slot.
Figure 7:
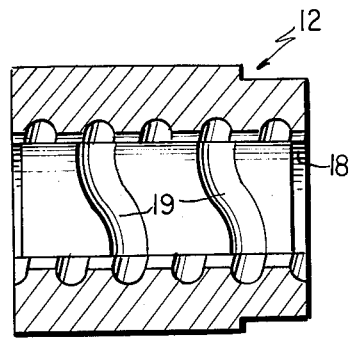
FIG. 7 is a sectional view taken along the line 7—7 on FIG. 6.

In FIGS. 6 and 7, a nut member assembly 12 is shown which essentially is the same as that described with reference to FIGS. 1 to 5, except that the slot 17 is arcuate and the base 21 of the element 18 is arcuate with the bearing surfaces of the slot and base approximately matching each other and being dimensioned for movement of the base in the slot. This arrangement allows the elements 18 to slightly rock or rotate about an axis parallel to the longitudinal axis of the bore 13 and to move freely in an axial direction.

Preferably, the slot and the base each have an arcuate or circular bearing surface extending slightly more than 180° whereby the element 18 is keyed in the solt 17. For example, the bearing surface of the slot may extend about 205° and the bearing surface of the base may extend about 210°.

Figure 8:
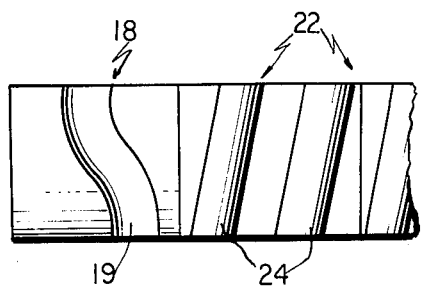
FIG. 8 is a view similar to FIG. 2 illustrating another cross-over insert arrangement apart from the nut.
Figure 9:
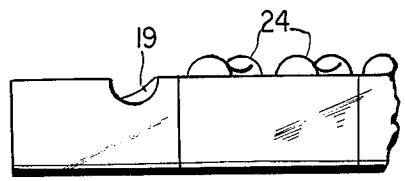
FIG. 9 is a fragmentary side elevational view of the insert shown in FIG. 8.

In FIGS. 8 and 9, a nut member assembly is shown wherein the element 18 could be arranged as described with reference to either FIGS. 1 to 5 or FIGS. 6 and 7. In this embodiment of the invention, a plurality of elements 18 are employed each having one cross-over groove 19 thereon whereby each cross-over is independently adjustable with respect to the convolution in which balls are circulated.

This arrangement enables the number of ball tracks to be varied within a nut of a given length by placing spacers 22 between working cross-over elements 18. Such spacers could be provided by idle elements 18 with the balls being omitted from the convolutions which their channel crosses, but preferably the spacers are given a useful function, for example, by providing them with a helical convolution or rib section 24 adapted to mate with the groove 11 of the screw member to wipe the surfaces of the groove as the screw passes through the nut. Such sections 24 could also be utilized to supply the groove 10 with a lubricant by constructing the same of a solid mass of bearing lubricating material such as a porous mass impregnated with a liquid lubricant or forming the same of a briquetted dry lubricant suitable for high temperature applications. It is contemplated that certain of the spacers may serve to lubricate the screw groove whereas other spacers may merely serve as wipers.

It will be observed that the cross-over grooves 19 are spaced so that the entrance and exit openings of adjacent grooves do not overlap, whereby elements 18 can be constructed by mass production fabrication of a long bar formed with the base and grooves, and then cutting the bar into individual elements 18 having a desired length and the desired number of grooves 19 thereon. The spacers could be fabricated in a similar manner.

From the foregoing description, it will be seen that the present invention provides an improved ball screw and nut cross-over and self lubricating arrangement which is particularly adapted for miniature size ball screw and nut assemblies but which also has features which can be used to advantage in connection with such assemblies of larger sizes.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a ball screw and nut assembly, the combination of a screw member having external helical ball groove convolutions thereon, a nut member having a bore provided with internal helical ball groove convolutions therein for cooperation with said screw member ball groove convolutions to confine balls therein and having an axially extending radially facing arcuate slot passing through said ball groove convolutions, balls confined between certain of said screw and nut member groove convolutions, and a cross-over element having cross-over groove means for transferring and circulating balls within one complete screw and nut member groove convolution, said element having an arcuate base approximately matching said slot and dimensioned to be movably positioned in said slot to enable said element to rotate slightly in said slot and to move slightly in an axial direction in response to balls transferred by said cross-over groove means.

2. An assembly according to claim 1, wherein said slot and said base each have an arcuate bearing surface extending slightly more than 180°.

3. In a ball screw and nut assembly, the combination of a screw member having external helical ball groove convolutions thereon, a nut member having a bore provided with internal helical ball groove convolutions therein for cooperation with said screw member ball groove convolution to confine balls therein and having an axially extending radially facing slot passing through said ball groove convolutions, balls confined between certain of said screw and nut member groove convolutions, a plurality of cross-over elements each having cross-over groove means for transferring and circulating balls within one complete screw and nut member groove convolution and being positioned in said slot, and spacing means positioned in said slot between said elements, said elements and said spacing means having a base movable in said slot in an axial direction.

4. An assembly according to claim 3, wherein said spacing means has configurations in wiping contact with said screw member groove convolutions.

5. An assembly according to claim 4, wherein said configurations are formed of a solid mass of lubricating material.

6. A ball screw nut member assembly comprising a nut member having a bore extending therethrough provided with helical ball groove convolutions therein and having an axially extending radially facing arcuate slot in the wall thereof passing through said convolutions, and a member having an arcuate base formed with a bearing surface approximately matching said slot and being dimensioned to be positioned in said slot for slight rotary movement and slight movement in an axial direction and having ball cross-over groove means therein for cooperation with certain of said ball groove convolutions.

7. An assembly according to claim 6, wherein said slot and said base each have an arcuate bearing surface extending slightly more than 180°.

8. A ball screw nut member assembly comprising a nut member having a bore extending therethrough provided with helical ball groove convolutions therein and having an axially extending radially facing slot in the wall thereof passing through said convolutions, a plurality of elements positioned in said slot each having ball cross-over groove means therein for cooperation with certain of said ball groove convolutions, and spacing means between said elements, said elements and said spacing means having a base movable in said slot in an axial direction.

9. An assembly according to claim 8, wherein said spacing means has configurations thereon for mating with the ball groove convolutions of a screw member for said nut member.

10. An assembly according to claim 9, wherein said configurations are formed of a solid mass of lubricating material.

References Cited by the Examiner

UNITED STATES PATENTS

| | | | |
|---|---|---|---|
| 2,473,743 | 6/1949 | Barnes | 74—459 |
| 2,706,693 | 4/1955 | Haller | 308—237 X |
| 2,895,343 | 7/1959 | Orner | 74—459 |
| 3,056,709 | 10/1962 | Rising et al. | 308—238 X |

FOREIGN PATENTS

| | | |
|---|---|---|
| 784,165 | 10/1957 | Great Britain. |
| 880,001 | 10/1961 | Great Britain. |

DAVID J. WILLIAMOWSKY, *Primary Examiner.*

DON A. WAITE, *Examiner.*

L. H. GERIN, *Assistant Examiner.*